No. 752,919. PATENTED FEB. 23, 1904.
L. P. McVAY.
REVERSIBLE AUTOMATIC MARKER FOR CORN PLANTERS.
APPLICATION FILED JUNE 22, 1903.
NO MODEL.
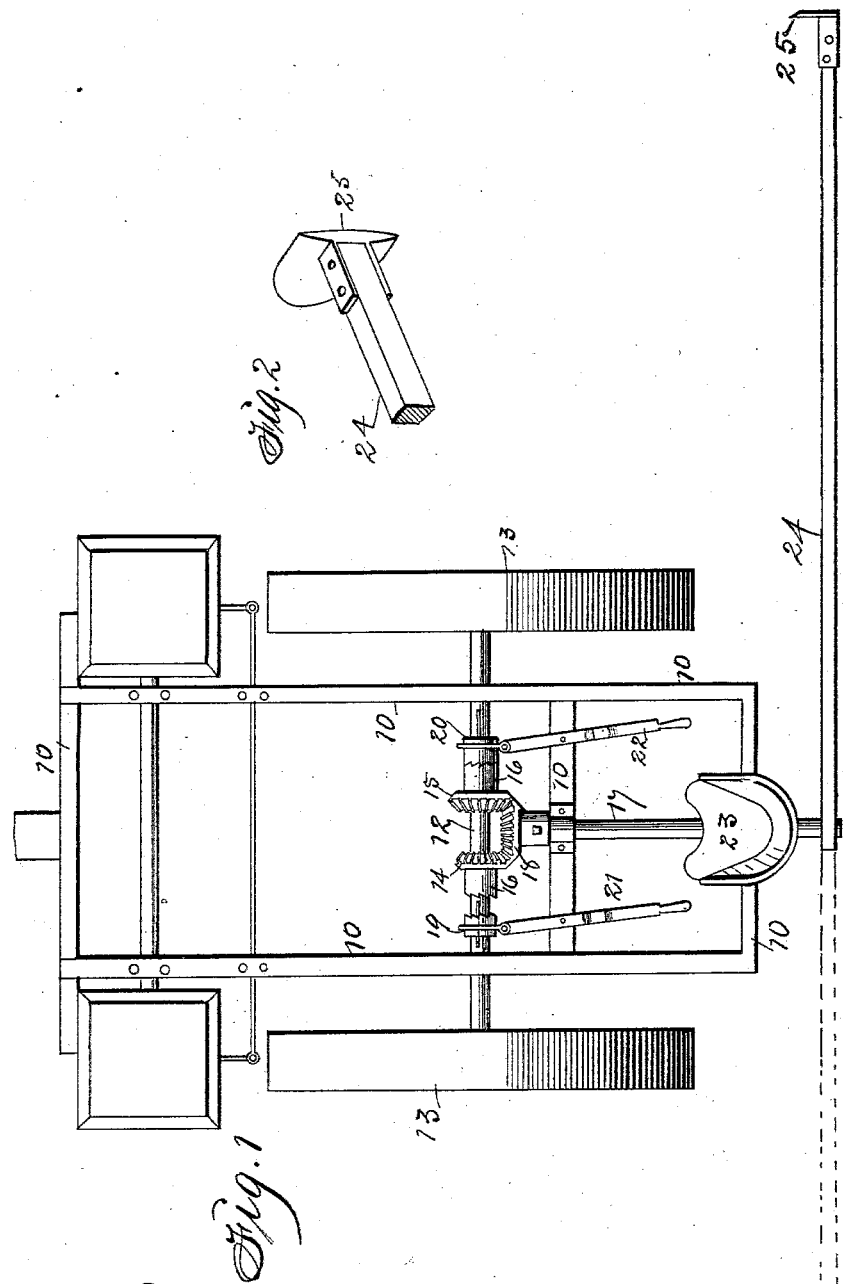

No. 752,919. Patented February 23, 1904.

UNITED STATES PATENT OFFICE.

LEONARD P. McVAY, OF NEW VIRGINIA, IOWA.

REVERSIBLE AUTOMATIC MARKER FOR CORN-PLANTERS.

SPECIFICATION forming part of Letters Patent No. 752,919, dated February 23, 1904.

Application filed June 22, 1903. Serial No. 162,691. (No model.)

*To all whom it may concern:*

Be it known that I, LEONARD P. McVAY, a citizen of the United States, residing at New Virginia, in the county of Warren and State of Iowa, have invented a new and useful Reversible Automatic Marker for Corn-Planters, of which the following is a specification.

My object is to prevent the labor and delay incident to turning an automatic corn-planter about at the ends of a field when it is necessary to manually adjust the marker mechanism carried by the planter every time a return trip is started; and my invention consists in combining reversing mechanism with the carriage-axle in such a manner that the driver on the seat can by means of a lever adjust a clutch so that a bar carrying a marker at its free end will by the action of the moving carriage reverse the position of the marker relative to the line of advance whenever the carriage is turned about to make a return trip across the field, as required in planting parallel rows.

In the accompanying drawing and plan view the numerals 10 designate different parts of a carriage-frame, 12 a rotatable axle, and 13 carriage-wheels fixed on the ends of the axle. Bevel gear-wheels 14 and 15, each having an integral clutch member 16, are loosely mounted on the axle. A rock-shaft 17 is mounted in bearings fixed to the carriage-frame to extend rearward from the center of the carriage-axle 12 and has a bevel gear-wheel 18 fixed to its front end to engage the loose wheels 14 and 15. Clutch members 19 and 20 are slidably connected with the carriage-axle to rotate therewith and to be alternately moved in and out of contact with the wheels 14 and 15 by means of levers 21 and 22, fulcrumed to the carriage-frame and within reach of the operator on the driver's seat 23. A straight bar 24 is fixed to the rear end of the rock-shaft, and to the free end of the bar is fixed a marker 25, that may vary in size and shape as desired.

In the position the marker is shown it will be automatically reversed as the planter is advanced by the action of the gear-wheel 15, that is fastened to the carriage-axle by the clutch member 20, that is in engagement with the member 16, and the bar 24 will be swung upward and to the left in a vertical plane to extend to the other side of the planter, as indicated by the dotted lines, and during such reverse motion the other wheel 14 will rotate as an idler. To return the marker 25 and bar 24 back again to the right side of the planter and line of advance, the clutch member 20 must be disengaged from the member 16, carried by the wheel 15, by moving the lever 22, and the clutch member 19 must be moved into engagement with the member carried by the wheel 14 by means of the lever 21.

I am aware a shaft having a bevel gear-wheel has been mounted on the rear end of a carriage to reverse a marker fixed thereto and bevel-gears and ratchets connected with a carriage-axle to operate said shaft; but in no instance have clutch members been connected with the bevel gear-wheels and mating clutch members been connected with the axle to be operated by hand-levers, as shown and described.

Having thus set forth the purpose of my invention, its construction, and operation, the utility thereof will be obvious to farmers and others familiar with the art to which it pertains, and

What I claim as new, and desire to secure by Letters Patent, is—

A reversible marker for corn-planters comprising a rotatable carriage-axle, two bevel gear-wheels mounted loosely on said axle and each wheel provided with a fixed clutch member, two clutch members slidably mounted on the said axle, two levers fulcrumed to the carriage-frame and pivotally connected with said slidable clutch members, a rock-shaft mounted in right-angled position to the carriage-axle and a bevel gear-wheel fixed to its front end and a straight bar fixed to its rear end to extend at right angles and provided with a marker on its end, arranged and combined to operate in the manner set forth for the purposes stated.

LEONARD P. McVAY.

Witnesses:
W. J. DAVIDSON,
J. R. HALL.